United States Patent
Aymeric et al.

(10) Patent No.: US 10,018,482 B2
(45) Date of Patent: Jul. 10, 2018

(54) METHOD FOR COMPUTING AND REPRESENTING DEVIATIONS FROM THE TRAJECTORY OF AN AIRCRAFT IN FLIGHT

(71) Applicant: THALES, Courbevoie (FR)

(72) Inventors: Bruno Aymeric, St Medard (FR); Xavier Servantie, Pessac (FR); Matthieu Claybrough, Ramonville (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 15/357,735

(22) Filed: Nov. 21, 2016

(65) Prior Publication Data

US 2017/0153120 A1    Jun. 1, 2017

(30) Foreign Application Priority Data

Nov. 27, 2015   (FR) ..................... 15 02481

(51) Int. Cl.
    *G01C 23/00*    (2006.01)
    *G08G 5/00*     (2006.01)

(52) U.S. Cl.
    CPC .......... *G01C 23/00* (2013.01); *G08G 5/0021* (2013.01); *G08G 5/0086* (2013.01)

(58) Field of Classification Search
    CPC ...... G01C 21/00; G01C 23/00; G01C 23/005; G05D 1/0202; G05D 1/0607; G05D 1/0646; G05D 1/0676; G08G 5/0008; G08G 5/0021; G08G 5/0034; G08G 5/0039; G08G 5/025; G08G 5/045; G08G 5/0086

USPC ...................... 340/979, 974, 975; 701/14, 18
See application file for complete search history.

(56) References Cited

U.S. PATENT DOCUMENTS

| | | | | |
|---|---|---|---|---|
| 3,668,623 A * | 6/1972 | Csaposs | ................. | G01C 21/22 340/976 |
| 5,289,185 A * | 2/1994 | Ramier | ................ | G01C 23/005 340/971 |
| 6,317,059 B1 * | 11/2001 | Purpus | ................. | G01C 23/005 340/973 |
| 8,965,601 B1 * | 2/2015 | Barber | ................ | G01C 23/005 340/974 |
| 2004/0015274 A1 * | 1/2004 | Wilkins, Jr. | ......... | G01C 23/005 701/3 |
| 2004/0225420 A1 * | 11/2004 | Morizet | ............... | G01C 23/005 701/3 |

(Continued)

*Primary Examiner* — Quan-Zhen Wang
*Assistant Examiner* — Stephen Burgdorf
(74) *Attorney, Agent, or Firm* — Baker & Hostetler LLP

(57) ABSTRACT

A method for the three-dimensional synthetic representation of the trajectory of an aircraft in flight being implemented in a flight and navigation system of an aircraft comprising a display system allowing synthetic images to be displayed, the flight plan of the aircraft comprises a predicted trajectory dependent on a non-georeferenced flight setpoint, the display of the predicted trajectory taking the form of a path represented by two limits separated by a determined width. The path comprises two branches, each branch positioned on the side of one of the two limits, each branch represented by a straight segment whose origin is a point located on the path at the current time and whose terminus is a point located at a determined distance away from the point of origin, the slope of the straight segment representative of the tangent to the predicted trajectory at the current time.

9 Claims, 5 Drawing Sheets

(56) References Cited

U.S. PATENT DOCUMENTS

| | | | |
|---|---|---|---|
| 2010/0023258 A1* | 1/2010 | Rouquette | G01C 21/00 |
| | | | 701/533 |
| 2010/0094487 A1* | 4/2010 | Brinkman | G01C 23/00 |
| | | | 701/14 |
| 2010/0097241 A1 | 4/2010 | Suddreth | |
| 2013/0060466 A1 | 3/2013 | Gurusamy et al. | |
| 2015/0081143 A1* | 3/2015 | Snow | G08G 5/0021 |
| | | | 701/16 |

* cited by examiner

METHOD FOR COMPUTING AND REPRESENTING DEVIATIONS FROM THE TRAJECTORY OF AN AIRCRAFT IN FLIGHT

CROSS-REFERENCE TO RELATED APPLICATIONS

This application claims priority to foreign French patent application No. FR 1502481, filed on Nov. 27, 2015, the disclosure of which is incorporated by reference in its entirety.

FIELD OF THE INVENTION

The field of the invention is that of graphically representing the three-dimensional trajectory of an aircraft in flight in a synthetic vision system, or SVS. More particularly, the field of the invention is that of representing deviations from the trajectory of an aircraft in flight.

BACKGROUND

In modern aircraft, the primary flight display screens now include a three-dimensional synthetic representation of the outside world. These representations may comprise an indicator of the flight plan followed by the aircraft. Older representations are of the "highway in the sky" type. The trajectory to be followed is then shown to the pilot in the form of a three-dimensional path superposed on the synthetic landscape. The width of the path is representative of the positioning tolerances of the aircraft in a horizontal plane. These tolerances are covered by aeronautical standards.

One of the drawbacks of these representations is that the represented path does not comprise clear indicators of angular deviations, both lateral and vertical, between the actual position of the aircraft and the path to be followed. As a result, the pilot lacks precise information in order to correct the trajectory of the aircraft.

SUMMARY OF THE INVENTION

The method according to the invention does not have these drawbacks. On the three-dimensional representation of the path, it displays deviations from the trajectory in the form of two straight segments or "branches". The lengths and slopes of each branch give him or her information on the lateral and vertical deviations from the trajectory. Additional symbols allow the values of these deviations to be specified. More specifically, the subject of the invention is a method for the three-dimensional synthetic representation of the trajectory of an aircraft in flight, said method being implemented in a flight and navigation system of an aircraft, said flight and navigation system comprising at least one navigation system, one cartographic database representing the overflown terrain, a three-dimensional image computer and a display system allowing computed synthetic images to be displayed, the flight plan of the aircraft comprising at least one setpoint trajectory dependent on a georeferenced flight setpoint, the display of said setpoint trajectory taking the form of a path represented by two limits positioned on either side of said setpoint trajectory and separated by a determined width, the displayed trajectory differing from the setpoint trajectory by a downwardly vertical offset;

characterized in that said displayed trajectory comprises at least two branches, each branch being positioned on the side of one of the two limits, each branch being represented by a straight segment whose origin is a point located on the path resulting from the projection of the current position of the aeroplane on this path and whose terminus is a point located at a determined distance away from the point of origin, following the exact tangent of the displayed trajectory, increased in height by the offset between the displayed trajectory and the setpoint trajectory.

Advantageously, each branch comprises a first symbol representing the theoretical slope of the setpoint trajectory.

Advantageously, the first symbol representing the theoretical slope of the setpoint trajectory comprises a vertical deviation scale and a vertical deviation index.

Advantageously, each branch comprises a second symbol for the lateral deviation of the aircraft between its position and the theoretical position determined by the setpoint trajectory.

Advantageously, the second symbol, representing the lateral deviation of the aircraft, comprises a succession of dots, the dot corresponding to the theoretical position having a different colour or shape to the other dots, the distance between two dots being equal to the determined width or to a fraction of said determined width.

Advantageously, the vertical deviation and the lateral deviation are expressed in angular or dimensional units.

Advantageously, the determined width of the path is constant.

Advantageously, the determined width of the path is variable and increases linearly from a determined origin upstream or downstream of the trajectory.

Advantageously, the three-dimensional image computer computes two first branches whose origin is located at the projection of the current position on the setpoint trajectory and two second branches, the second branches being constructed like the first but with an origin located at a determined distance away from the origin of the first branches along the setpoint trajectory, the displayed path comprises the first two branches, each first branch comprising an indicator regarding the position of the second terminus of the second branch.

BRIEF DESCRIPTION OF THE DRAWINGS

The invention will be better understood and other advantages will become apparent on reading the following description, which is given by way of non-limiting example, and by virtue of the appended figures in which.

DETAILED DESCRIPTION

The method for the three-dimensional synthetic representation of the trajectory of an aircraft in flight according to the invention is implemented in a flight and navigation system of an aircraft.

Figure 1:
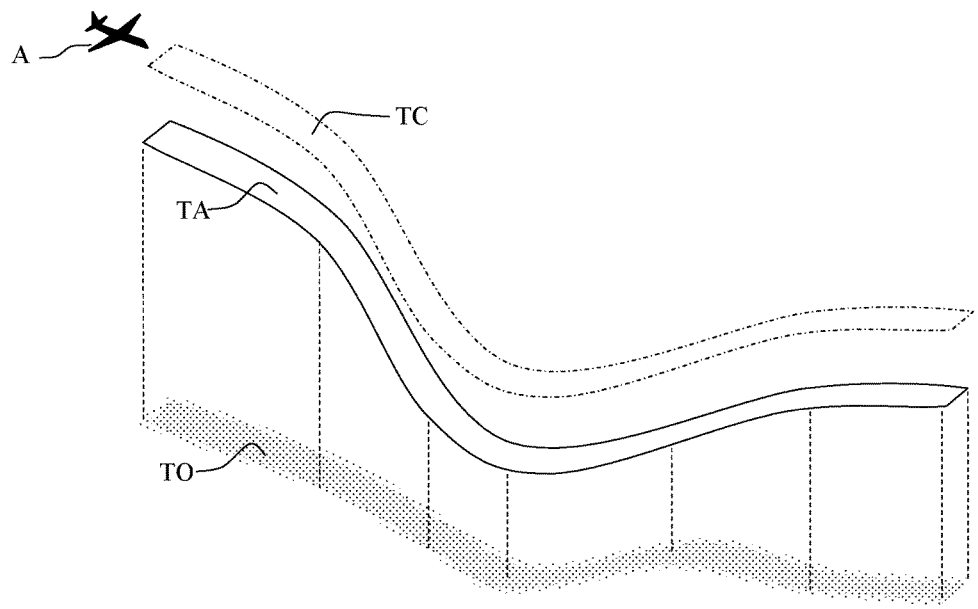
FIG. 1 shows a perspective view of the computed and displayed trajectories of an aircraft in flight.

This flight and navigation system comprises at least one navigation system, one cartographic database representing the overflown terrain, a three-dimensional image computer and a display system allowing computed synthetic images to be displayed. Generally, as may be seen in FIG. 1 which is a perspective view of terrain overflown by an aircraft A, the displayed trajectory TA shown in this FIG. 1 by a white strip takes the form of a path. As will be seen, the width of this path is not necessarily constant. This displayed trajectory is not necessarily coincident with the computed trajectory TC of the aircraft which is shown by the dotted line in FIG. 1. It may be advantageous to shift it into the vertical plane for ergonomic reasons. In FIG. 1, the shaded line TO indicates the track on the ground of the aircraft's trajectory.

An aeronautical trajectory of an aircraft comprises a lateral component located in a horizontal plane and a vertical component located in a vertical plane. The flight plan of the aircraft comprises georeferenced trajectory portions, referred to as imposed portions, and non-georeferenced trajectory portions, referred to as predicted portions. Of course, each lateral or vertical component of the trajectory may be imposed or predicted.

Figure 2:
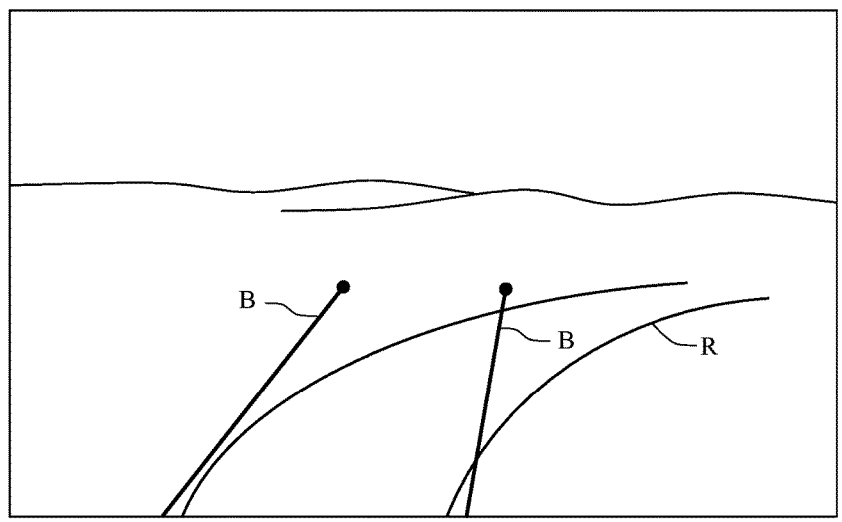
FIG. 2 shows a simplified view of a trajectory displayed by the method according to the invention on the screen of a display device.

When the trajectory is dependent on an imposed or georeferenced setpoint, as stated above, it is important for potential deviations between the imposed trajectory of the aircraft and its actual position to be presented to the pilot. In the method according to the invention, these deviations are represented by branches. More specifically, as shown in FIG. 2, the path R comprises two branches B, each branch being positioned on the side of one of the two limits, each branch being represented by a straight segment whose origin is a point located on the path resulting from the projection of the current position of the aeroplane on this path and whose terminus is a point located at a determined distance away from the point of origin, following the exact tangent of the displayed trajectory, but increased in height by the offset between the displayed trajectory and the setpoint trajectory in order to make it visible to the pilot.

Figure 3:
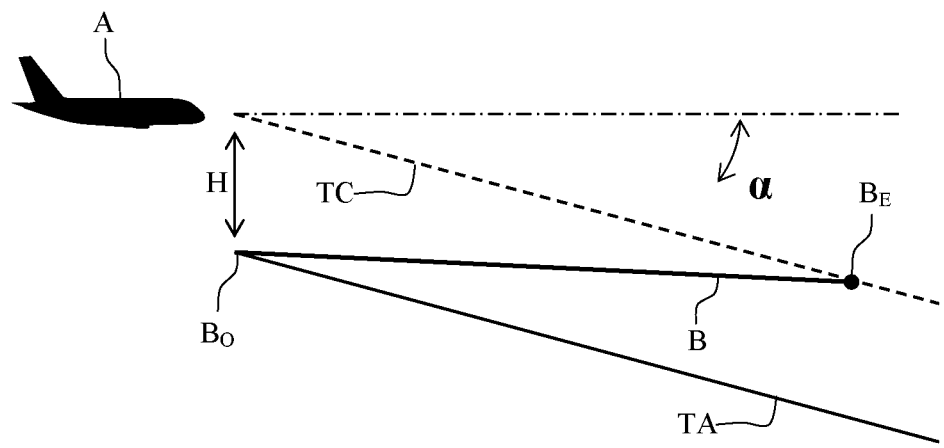
FIG. 3 shows a cross-sectional view in a vertical plane of a branch according to the invention.

FIG. 3 shows the computation of one of said branches in a vertical plane. It will be noted that the various elements are not shown to true scale, for the sake of clarity. At time T, the aircraft A occupies a determined position. The dotted line TC indicates the setpoint trajectory which must be followed by this aircraft. It follows a slope inclined at an angle α as indicated in FIG. 3. The line TA indicates the displayed trajectory. It is computed from a point located just below the aircraft A, at a distance H away therefrom. The value of this distance H is, by way of example, 200 feet or 60 meters.

The origin of the branch $B_O$ is located at this point. Its end $B_E$ is positioned at a determined distance away along the exact tangent to the displayed trajectory. This determined distance is of the order of a kilometer. It should be noted that if the setpoint trajectory is not rectilinear in the vertical plane, for example if it is stabilized at a particular altitude after a period of descent, the point $B_E$ may be located above or below the setpoint trajectory.

In order to complete the representation of the branches, each branch may comprise symbols allowing the deviations between the actual position of the aircraft and the position that it should occupy on its computed trajectory to be represented. By way of non-limiting examples, these deviations are shown in FIG. 4, which comprises two symbolic representations.

The first symbol SV represents the deviation in the vertical position of the aircraft existing between its actual position and the theoretical position determined by the setpoint trajectory. In FIG. 4, this symbol takes the form of an isosceles trapezium, the bases of the trapezium being vertical. Passing therethrough is a horizontal line P positioned at the slope of the setpoint trajectory or imposed slope. On the large base, the deviations are displayed so as to be more visible. In FIG. 4, a dotted line E extends horizontally from the terminus of a branch towards the symbol SV and passes therethrough while undergoing a magnifying glass effect. The distance between the frame of reference P and the end of the line E on the scale of SV is practically proportional to a metric vertical deviation between the position of the aeroplane and the setpoint trajectory. The length of the branch with respect to the vertical deviations in question is of the order of 500 feet and the theoretical slopes that are usually flown are less than 5°, making the usual approximation of the arctangent function of a value by the value itself sufficient. Markers or dots positioned on the large base and shown by unfilled circles allow the user to approximately know the value of the deviation. For example, the two dots closest to P correspond to a deviation by 250 feet and the two dots furthest away correspond to a deviation by 500 feet. The values of these deviations are usually given by the navigation system which usually sets the value of a dot by what is called the vertical scale factor.

The second symbol SL represents the lateral deviation of the aircraft existing between its position and the theoretical position determined by the setpoint trajectory. As shown in FIG. 4, it comprises two subsets, each subset being located close to the origin of one of the branches. Each subset comprises a dash symbolically represented by an "I" in FIG. 4 and some dots, symbolically represented by "0"s in this same figure. The dots are positioned such that, if the lateral deviation is equal to once the lateral scale factor, the branch on the side of the deviation passes through the first dot, if the lateral deviation is equal to twice the lateral scale factor, the branch passes through the second dot. As for the vertical scale factor, the lateral scale factor is generally given by the navigation system. The width of the path may also be twice this scale factor. The position of the branches at the point of passing through these symbol subsets represents the lateral deviation of the aircraft with respect to its imposed position.

Figure 4:
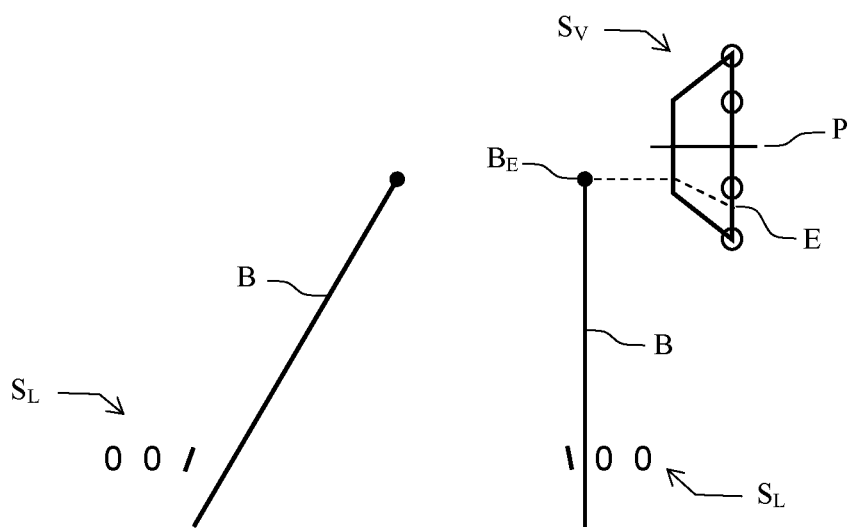
FIG. 4 shows the lateral deviation and vertical deviation symbols according to the invention.

In FIG. 4, the small lines of the scale SL are inwardly inclined, the theoretical angle being that which the branches would have had if the deviation in the lateral position were zero. Moreover, if a deviation by a half-path is represented by a dot, then, if a branch is vertical, the value of the deviation is a half-path and the branch passes through the first dot.

Figure 5:
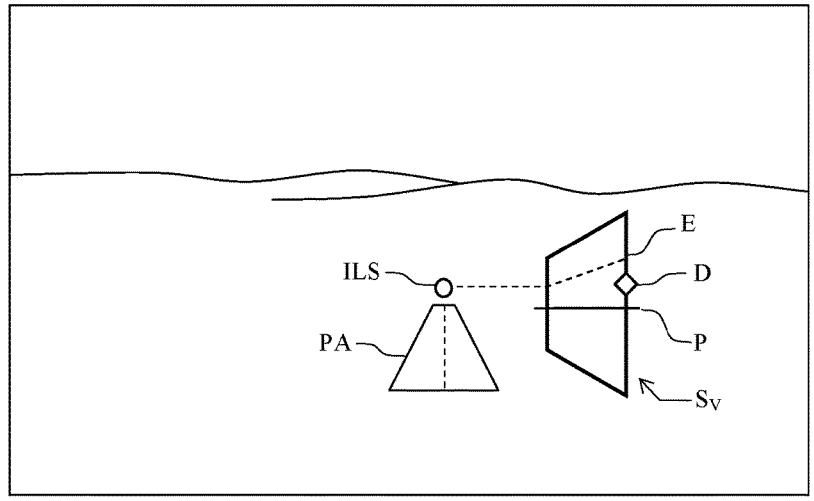
FIG. 5 shows a variant of the vertical deviation symbol according to the invention.

It is possible to adjust the preceding symbols in order to represent the angular deviations in certain phases of the flight plan in which this representation is more suitable. For example, when the aircraft is in the runway approach phase, a mode known by the term "glide slope", it is guided by an approach system of instrument landing system (ILS) type. The displayed and controlled deviations are then no longer expressed in terms of metric values, but rather in terms of angular values with respect to the source of a geolocalized signal. Typically, a glide beam is centred on a descent plane with a theoretical slope of the order of 3°. The onboard equipment announces a deviation of zero to the crew if the slope between the aeroplane and the signal transmitter is 3°. The deviation displayed if this slope is 3.2° is two times higher than if this slope is 3.1°. In this case, instead of extending the terminus of the branch into the symbol SV as indicated in FIG. 4, the theoretical position of the origin of the signal is extended. This is shown in FIG. 5 which shows an outside landscape comprising a runway PA shown in perspective and a glide slope marker beacon represented by a circle. The glide slope marker beacon is at the edge of the runway, on the left of the figure, close to the beginning of the runway. The dotted line E still represents a deviation between the imposed position and the actual position of the aircraft. However, in this case, the distance between E and P varies linearly with respect to the difference between the theoretical slope of the approach and the slope of the aeroplane.

It should be noted that rather than using the theoretical position of the glide slope marker beacon, which is not necessarily known in the usual databases, a datum computed from the position of the runway threshold or from the theoretical approach slope, which are indeed included in the databases, may be used, taking advantage of the fact that the glide axis is always configured to cross the runway threshold at a height of 50 feet. The position of an "ideal" touchdown point on the runway is thus obtained which may advantageously be represented in the image and be the source of the line E.

The represented deviations are theoretical deviations based on a localization of the aeroplane by a global positioning system (GPS) type source and a database indicating the theoretical position of the guidance sources of GS antenna and LOC (localizer) antenna types. In the case of an effective guidance of the aeroplane through the use of these signals, the deviation scales are supplemented by a deviation indicator, referred to as a "rough" indicator, arising from the radio receivers of the aeroplane which receive these signals. In FIG. 5, this deviation is represented by a rhombus or "diamond" D.

Figure 6:
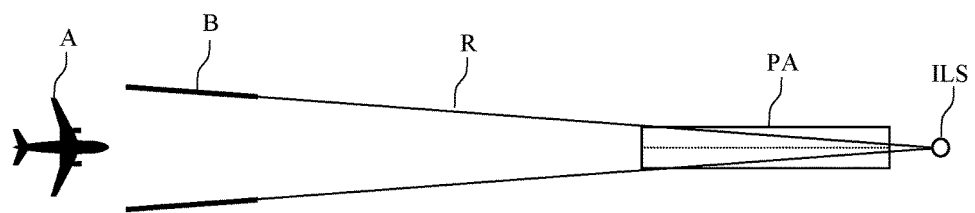
FIG. 6 shows a view from above of a path of variable width representing a displayed trajectory.

In this type of approach, in order to continue to represent the lateral difference correctly when it is angular, it is sufficient to take a path R narrowing in size and whose origin is the guidance source as shown in FIG. 6, which shows a view from above the runway PA. It is therefore possible to continue using the branches B to represent the lateral deviations through the use of the principles defined above.

Figure 7:
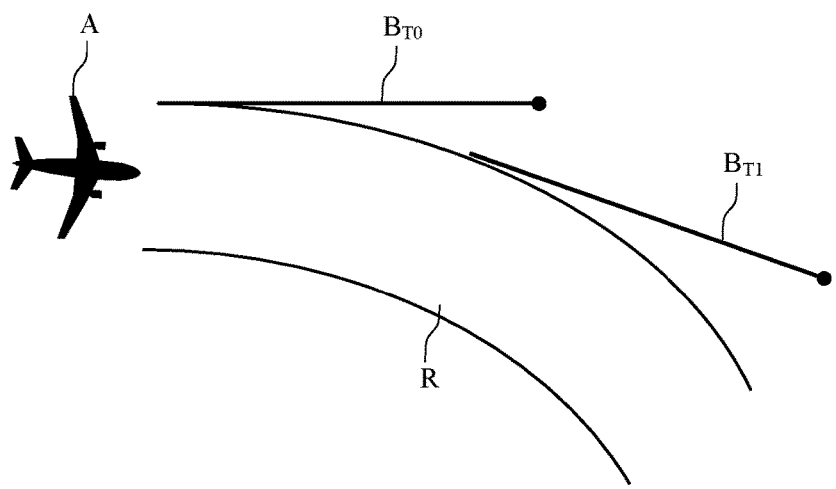
FIG. 7 shows the principle of computing two pairs of branches at two different flight times.

Throughout the preceding text, the branches are computed and displayed with an origin at the projection of the current position. It is possible to use the representation per branch as an aeroplane guidance assistant. The principle is to compute the terminus of the branch for an aircraft projected a certain distance in front on its trajectory. This distance may be fixed, of the order of 250 meters, or variable. In the latter case, it represents a determined flight time of the order of a few seconds. The distance then depends on this flight time and on the speed of the aircraft. FIG. 7 shows a view from above of the followed path R and the branches $B_{T0}$ and $B_{T1}$ computed at two different times T0 and T1.

Figure 8:
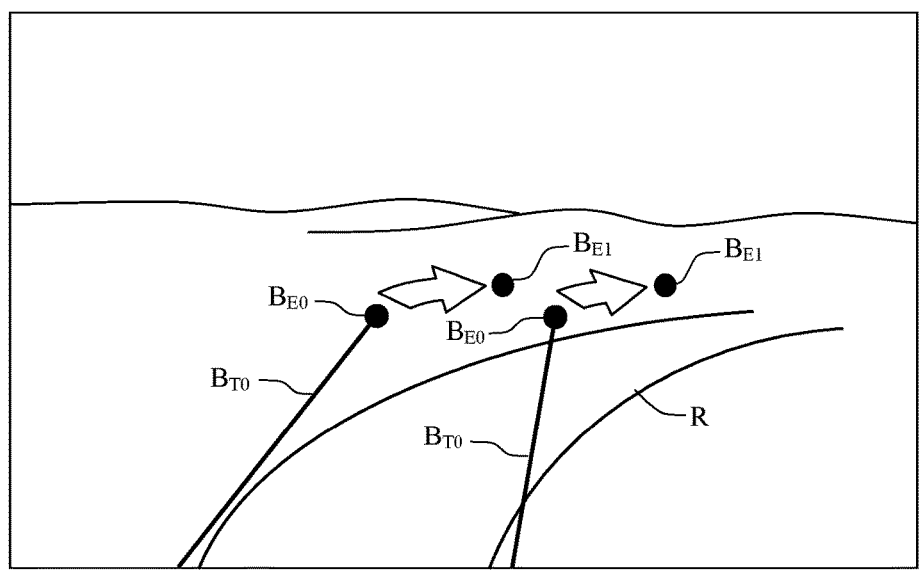
FIG. 8 shows a first mode for displaying the second pair of branches.
Figure 9:
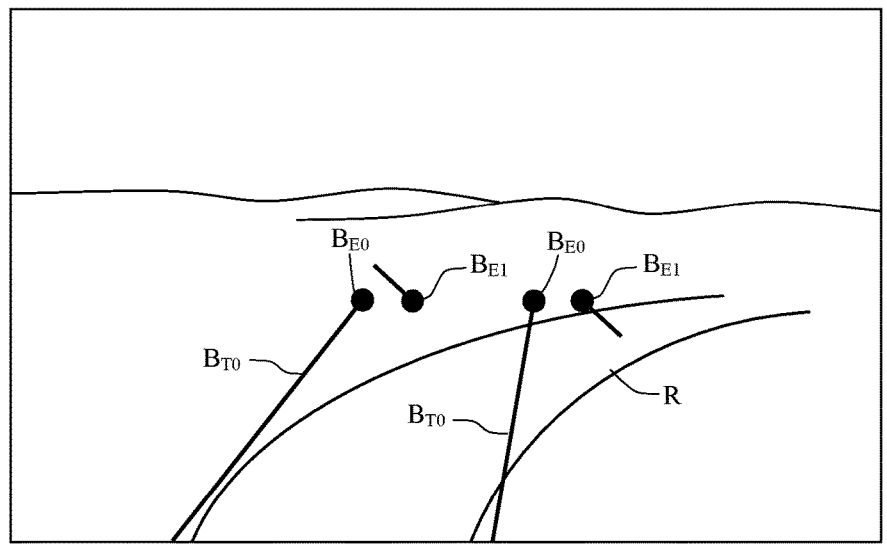
FIG. 9 shows a second mode for displaying the second pair of branches.

In this case, the display means then add, to the terminus of each branch, an indicator of the position of the terminus of the "projected" branch. By way of first example, in FIG. 8, each branch end comprises a circle representing the future position of the branch and an unfilled arrow indicating the progression of the branch. By way of second example, FIG. 9 shows a second possible representation of the projected branch. In this latter case, this second representation adds, to the terminus of the branch, an indicator of roll to be taken into account in order to stay correctly positioned in the centre of the path. This roll indicator is marked by two segments oriented in opposite directions.

The invention claimed is:

1. A method for the three-dimensional synthetic representation of a trajectory of an aircraft in flight, said method comprising:
    implementing a flight and navigation system of the aircraft, said flight and navigation system comprising:
        at least one navigation system,
        one cartographic database that stores data representing an overflown terrain,
        a three-dimensional image computer,
        a display system allowing computed synthetic images to be displayed, and
        a flight plan of the aircraft comprising at least one setpoint trajectory dependent on a georeferenced flight setpoint,
    displaying on the display system a representation of the setpoint trajectory that takes a form of a path represented by two limits displayed and positioned on either side of said setpoint trajectory and separated by a determined width; and
    displaying on the display system a trajectory, the displayed trajectory differing from the setpoint trajectory by a downwardly vertical offset;
    wherein said displayed trajectory comprises displaying on the display system at least two branches, each branch being positioned on a side of one of the two limits, each respective branch being represented by a straight segment whose origin is a point located on a path resulting from a projection of a current position of the aircraft on the path with a terminus that is a point located at a determined distance away from a point of origin, each respective branch following an exact tangent of the displayed trajectory, increased in height by the vertical offset between the displayed trajectory and the setpoint trajectory.

2. The method for the three-dimensional synthetic representation of the trajectory of an aircraft in flight according to claim 1, wherein each branch comprises a first symbol representing a theoretical slope of the setpoint trajectory.

3. The method for the three-dimensional synthetic representation of the trajectory of an aircraft in flight according to claim 2, wherein the first symbol representing the theoretical slope of the setpoint trajectory comprises a vertical deviation scale and a vertical deviation index.

4. The method for the three-dimensional synthetic representation of the trajectory of an aircraft in flight according to claim 1, wherein each branch comprises a second symbol for a lateral deviation of the aircraft between the current position of the aircraft and a theoretical position determined by the setpoint trajectory.

5. The method for the three-dimensional synthetic representation of the trajectory of an aircraft in flight according to claim 4, wherein the second symbol, representing the lateral deviation of the aircraft, comprises a succession of dots, one of the dots corresponding to the theoretical position having a different colour or shape to other dots, a distance between two dots being equal to a determined width, or to a fraction of said determined width.

6. The method for the three-dimensional synthetic representation of the trajectory of an aircraft in flight according to claim 2, wherein a vertical deviation and a lateral deviation are expressed in angular units or dimensional units.

7. The method for the three-dimensional synthetic representation of the trajectory of an aircraft in flight according to claim 1, wherein the determined width of the path is constant.

8. The method for the three-dimensional synthetic representation of the trajectory of an aircraft in flight according to claim 1, wherein the determined width of the path is variable and increases linearly from a determined origin upstream or downstream of the setpoint trajectory.

9. The method for the three-dimensional synthetic representation of the trajectory of an aircraft in flight according to claim 1, wherein the three-dimensional image computer is configured to compute the at least two branches whose origin is located at the projection of the current position on the setpoint trajectory and two second branches, the two second branches being constructed like the at least two branches, but the two second branches have an origin located at a determined distance away from the origin of the at least two branches along the setpoint trajectory, and a displayed path comprises the at least two branches, each of the at least two branches comprising an indicator showing a position of a second terminus of each of the second branches.

\* \* \* \* \*